March 15, 1966 — J. BURKHOLDER — 3,240,227
SERVICE MAIN VALVE TAP FITTING
Filed Oct. 16, 1963 — 2 Sheets-Sheet 1
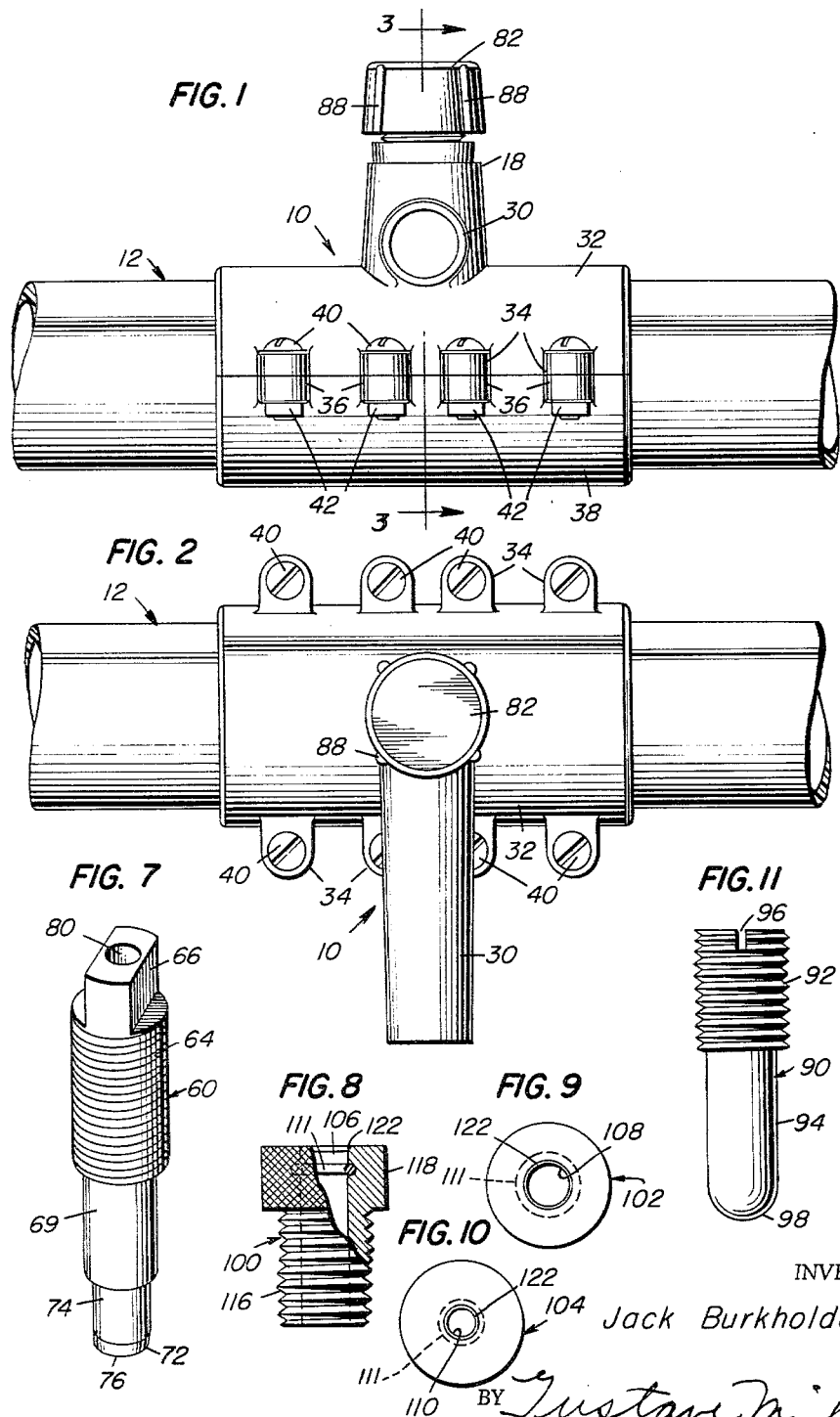
INVENTOR
Jack Burkholder
BY Gustave Miller
ATTORNEY

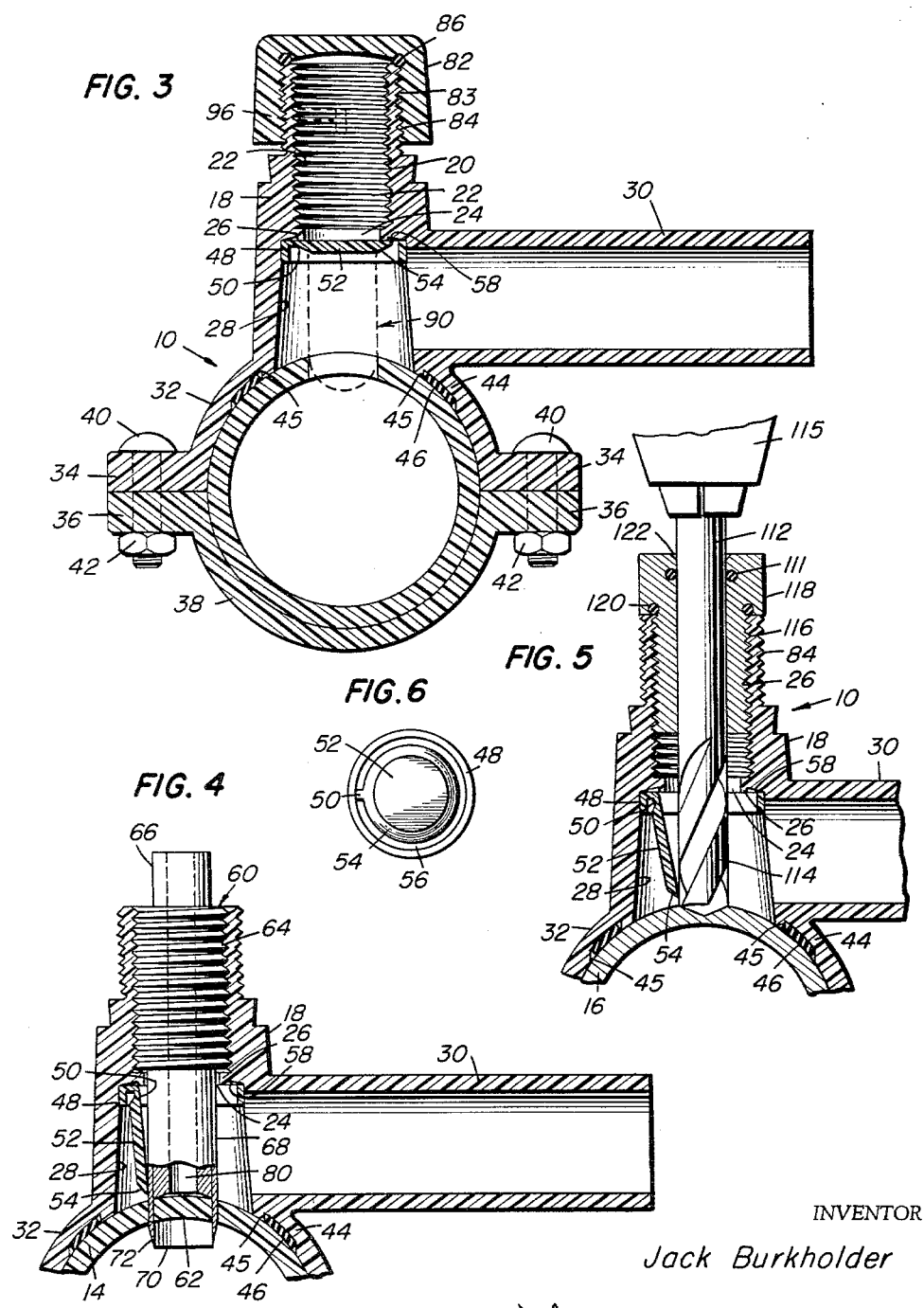

United States Patent Office 3,240,227
Patented Mar. 15, 1966

3,240,227
SERVICE MAIN VALVE TAP FITTING
Jack Burkholder, % Mid-Atlantic Plastic Corp.,
P.O. Box 1099, Danville, Va.
Filed Oct. 16, 1963, Ser. No. 316,644
18 Claims. (Cl. 137—318)

This invention relates to a service main valve tap fitting and has for an object to provide an improved tap fitting which is readily attachable to service mains, whether of plastic or of metal, carrying fluid under pressure, so as to connect a service pipe to the service main without permitting the escape of the fluid to the atmosphere whether the fluid be gas, or water, or any other type of fluid. While metal service mains have long been known, plastic service mains, particularly for gas distribution, and plastic service pipes running from such mains into buildings have relatively recently come into use. Use of all types of service mains involve the problem of connecting service pipes thereto while the service main is continuously in operation. Obviously, it is desirable to make the connection of a service pipe to a service main, irrespective of the material, without any escape of fluid to the atmosphere, and even more desirable when the main carries gas, the escape of which would create a hazardous condition. More recently, the problem has become even more acute, because of the increasing use of higher pressures in gas mains. Metal or plastic service self-tapping valve fittings for connecting metal or plastic service pipes to metal or plastic mains have been developed and presented to the trade. Such valve fittings are not entirely satisfactory, however, for various reasons, among which is included appreciable leakage of fluid from the main to the atmosphere during the connecting operation. Although such leakage is relatively small, any leakage of gas whatsoever obviously creates a potentially hazardous situation.

Further, known service main valve fittings for attachment to service mains have no means for cut off of fluid flowing therethrough in the event that repairs are necessary to the service line.

Some types of self-tapping service fittings necessitate the abandonment of the coupon cutting knife or drilling bit in the fitting when it is installed, thus necessitating the use of a new cuting knife or drill bit in each service fitting.

It is a further object of this invention to provide a service main valve tap fitting wherein the coupon cutting blade, as used on a plastic service main, or a drilling bit, as used on a metal main, is readily removed on completion of the operation, so that the same cutting blade or drill bit may be used in subsequent fittings, thus greatly reducing the overall cost of installing the fitting.

Still a further object of this invention is to provide an improved service valve fitting wherein a separate sealing plug may be readily inserted at any time when it is necessary to cut off service through the tap to the service pipe, and wherein the sealing means may be readily removed at any time when it is desired to restore service from the service main to the service pipe through the tap.

Still a further object of this invention is to provide a service main valve tap fitting that may be made in any one of several different sizes by providing a plurality of different size cutting blades or drilling bits for use on the one size of service main and service pipe.

Still a further object of this invention is to provide a service main valve tap fitting which is preferably made of a very tough leak-proof polyethylene plastic material now available on the market, or may be made of suitable metal, which may be used either on plastic mains or on metal mains, the cutting blade or drilling bit being made of suitable metal.

A further object of this invention is to provide a cutting blade for use on plastic mains which may be made in several sizes for use on one size of valve tap fitting and likewise, a special drill bit and drill bit guide tube assembly, which may likewise be made of several sizes, with the coupon cutting blade or the drill bit and drill bit guide tube assembly being used interchangeably on the same valve tap fitting, depending on whether the fitting is being connected to a plastic service main or a metal service main, the coupon trapping cutting blade being appropriate for plastic service mains, and the drilling bit assembly being appropriate for pipe mains.

Still a further and most essential object of this invention is to provide a very inexpensive valve flap and valve ring therefor which is secured in the fitting and left therein, which valve flap readily opens under pressure of the cutting blade or drilling bit to permit the passage thereof through the tap fitting to cutting or drilling position, and which moves into closed position automatically under pressure of the fluid from the service main as the blade or drilling bit is removed, so as to hold the pressure back against leakage, or at least against any substantial leakage, while a more secure sealing tap is readily and quickly manually secured on the tap to prevent any possible leakage whatsoever therefrom.

Still a further object of this invention is to provide a readily insertible and removable sealing plug which may be inserted through the tap fitting at any time that it is desired to cut off service from the main to the service pipe, and may be readily removed thereafter at any time when it is desired to restore such services, the material of the sealing plug being of a different degree of hardness than the material of the service main, so that when the sealing plug is put in place, the material of the one or the other of them will coldflow to provide a leak-proof seal.

Still a further object of this invention is to provide a cutting blade having a tool cooperating means thereon for rotating the cutting knife under the influence of the tool, wherein the tool cooperating means is of the same size as the tool cooperating means in the means for securing the fitting in place on the service main, thus making one tool serviceable for both operations and reducing the number of tools otherwise needed in the operation of installing the fitting.

With the above and related objects in view, this invention consists in the details of construction and combination of parts, as will be more fully understood from the following description, when read in conjunction with the accompanying drawing, in which:

FIG. 1 is a side elevational view of the tap of this invention, as mounted in operative position on a section of service main.

FIG. 2 is a top plan view of FIG. 1.

FIG. 3 is a sectional view on line 3—3 of FIG. 1, and also including the sealing plug in phantom view.

FIG. 4 is a sectional view through the tap applied to a plastic service main, with a coupon cutting knife in operative position.

FIG. 5 is a similar view on a metal main pipe, with a short flute, long shank drill bit mounted through a removable drill guide.

FIG. 6 is a bottom plan view of the flap valve per se.

FIG. 7 is a perspective view of a coupon cutting knife for cutting a smaller size coupon.

FIG. 8 is a partly sectional, partly elevational view of a drill bit guide.

FIG. 9 is a top plan view of FIG. 8.

FIG. 10 is a similar plan view of drill guide for a smaller drill.

FIG. 11 is an elevational view of an insertible and removable tap seal plug.

There is shown at 10 the service main valve tap fitting of this invention for providing a valved service fitting on a service main 12, wherein the fitting is of suitable, tough polyethylene plastic material well known in the trade (one example being made by Phillips Chemical Co. Marlex TR–212, a polyethyelne type 3, long lineal) or of a suitable metal, and wherein the service main is of a suitable plastic material, as now well known, as shown at 14 in FIG. 4, or is of metal, as shown at 16 in FIG. 5. The fitting 10 includes a tube 18 having a through bore therethrough. This through bore in tube 18 consists of a small cylindrical counterbore 20, having an internal thread at 22, and is connected by an opening 24 through a shoulder flange 26 to a larger counterbore 28, the larger counterbore 28 being of progressively increasing diameter as it approaches its service main connecting end. It will be specially noted that the opening 24 in shoulder flange 26 is of a smaller diameter than the diameter of the smaller diameter counterbore 20, thus providing an internally extending shoulder in both the small and the large counterbores 20 and 28.

A service pipe outlet tube 30 extends integrally from the side of the larger counterbore portion of the tube 18, for use in making a connection to any conventional service pipe in a conventional manner. The larger counterbore 28 extends through a saddle 32 integrally extending from the flanged end of the tube 18 and the saddle terminates in two sets of outwardly extending ears 34, approximately 180 degrees from each other, which cooperate with similar ears 36 on a saddle clamp 38. The saddle and saddle clamp cooperate with each other, when secured by appropriate fastening means, to embrace the service main 10 therebetween. As herein shown, the saddle 32 and saddle clamp 38 have their inner surfaces complementary to the outer surface of the service main 12, and the fastening means consists of bolts 40 and nuts 42, the bolts extending through mating apertures in ears 34 and 36. Although bolts and nuts are herein disclosed as fastening means, any other suitable fastening means could be used, such as the stud bolts and threads in one set of ears, as disclosed in applicant's prior application for a Self-Tapping Service Valve Fitting, Serial No. 198,852, filed May 31, 1962.

To seal the saddle against leakage from the larger counterbore end of the tube 18, there is provided a washer receiving recess 44 countersunk at 45 in the direction of the counterbore 28 so as to prevent coldflow of a washer 46, of suitable material, suitably glued within the recess 44.

Secured to the shoulder flange 28 on the larger counterbore side thereof is a valve ring 48, of somewhat flexible plastic material, from which integrally extends a hinge 50 connected to a small edge portion of a valve flap 52, as separately shown in FIG. 6. The diameter of the valve flap 52 is slightly greater than that of the opening 24 in shoulder flange 26, hence the valve flap 52 will seat, under pressure of fluid from the service main, against the shoulder flange 26 and close the opening 24 against any leakage. It will be noted that the outer bottom surface of valve flap 52 is beveled as at 54, and that there is an open annulus 56 between the beveled edge 54 of valve flap 52 and the valve ring 48. In addition, the larger counterbore portion of tube 18 flares outwardly. Accordingly, it is apparent that the valve flap 52 may hinge downwardly, as shown in FIG. 4, to a position where it may be clear of a projection of the rim of the shoulder flange opening 24 and of any object extending axially through such opening 24. The valve ring 48 is attached in the upper smaller end of the larger counterbore 28 against the bottom of the shoulder flange 26 in at least three equally spaced points, but may of course be attached in a complete circumference. So that the shoulder flange may provide an even better valve seat for the valve flap 52, it may be slightly undercut, as shown at 58, permitting the beveled edge 54 of valve flap 52 to extend or press thereover as seen in FIG. 3.

When used on a plastic service main 14, as shown in FIG. 4, a cutter plug 60 is provided for cutting and trapping a coupon 62 from the plastic main 14. The cutter plug 60 has a threaded body portion 64 complementary in length to the thread 22 in the internally threaded smaller counterbore 20, and extending on the outer end of the body portion 64 is a tool cooperating flattened end 66. The width of this flattened end 66 is the same as that of the nuts 42, so that the same end wrench used for tightening the nuts 42 may be used for rotating the cutter plug 60 on its threaded body portion 64 within the internally threaded small counterbore 20.

Extending from the bottom end of the threaded body portion 64 of cutter plug 60 is a neck 68 of a reduced diameter to fit and extend through the shoulder flange opening 24, and extending from the end of this neck 68 is a circular cutting blade 70 having a beveled edge 72 flaring outwardly to the outer periphery of neck 68. This construction results in cutting a coupon 62 and trapping it within the cylindrical inner surface of the blade 70, for the coupon, of plastic, is somewhat arcuate, so that, as the blade 70 cuts down, it may tend to bunch up the material of the coupon as it is being cut, and when the cut is completed, the coupon 62 may tend to expand a slight amount, also due possibly to heat expansion from the friction created by the cut, and hence holds itself within the hollow, circular blade 70 and is withdrawn with the blade. In addition, the fluid pressure in the service main pushes the cut coupon 62 into the blade 70 until it abuts the plug neck 68.

The length of the blade is such that when the threaded body portion 64 has just completely entered the internally threaded counterbore 20, the bottom of the body portion 64 is abutting the top shoulder of the shoulder flange 26, and the cutter blade 70 has penetrated the thickness of the plastic service main 14. If it is desired to make a smaller tap hole in the plastic service main 14, then a cutter 60 as shown in FIG. 7 is used, having a still smaller neck 74 extending from a shortened neck 69 and terminating in a smaller cutting blade 76 beveled at 72. Preferably, a third cutter plug is provided with a still smaller neck and cutter blade (not shown) all of which may be used with the same size of fitting 10 for the same size of plastic service main 14. Obviously, as many different size cutter plugs and blades may be provided as desired.

When the cutter plug 60 with its entrapped coupon 62 is withdrawn by unthreading the plug from the internally threaded counterbore 20, a plunger or rod may be inserted through the axial opening 80 to eject the coupon 62 therefrom, whereupon the same cutter plug 62 may be used subsequently when installing another similar fitting 10. The presence of this axial opening also assists the pressure in the plastic service main 14 in pushing the coupon 62 into the cutter blade 70 against the shoulder provided by the end of the neck 68 or 69. As the cutter plug 60 is withdrawn, the valve flap 52 is urged to sealing position against the undercut shoulder flange 28 by the pressure of the fluid in the service main 14 and the fluid is held against leaking by the valve flap 52, and of course is simultaneously diverted through the service pipe tube 30, which of course is connected up to its service pipe, in a conventional manner, thus temporarily reducing the pressure against the valve flap 52 until the service pipe has had time to fill, and reducing the likelihood of developing a leak around the valve flap 52.

As soon as the cutter plug 60 is withdrawn, a sealing cap 82, internally threaded at 83 complementary to an external thread 84 on the end portion of the smaller countbore 20, is manually placed thereon and threaded tight until a sealing O-ring 86, partly countersunk within the cap 80, abuts against the annulus at the end of the small counterbore portion of tube 18 to provide a seal capable of withstanding any pressure that might be present in the service main. The fitting 10 is thus in position for indefinite service.

However, should it be desirable to temporarily or permanently cut off service from the service main 10 to the service pipe connected to the service tube 30, the sealing cap 82, with its knurling ribs 88, is removed and a readily removable sealing plug 90, shown in phantom in sealing position in FIG. 3 and in full in FIG. 11, having a threaded portion 92 complementary to the internal thread 22 of small counterbore 20, and a reduced neck 94 of a diameter to just fit through shoulder flange opening 24 and of a length to extend into the tap hole in the service main 10, is inserted through the tube 18 by means of a screw driver cooperating with the kerf 96 until an area of hemispherical end 98 abuts against the edge of the tap hole in the service main 12. The material of the sealing plug 90 is of a different degree of hardness than that of the service main 10, the plug 90 being preferably of aluminum, which is harder than the material of the plastic main 14 and softer than the material of the metal service main 16. As the sealing plug is inserted into the tap hole of the service main 12, the difference in hardness causes a coldflow of the softer material and thus provides a tight seal on the tap hole.

When the fitting 10 is to be applied to a metal service main 16, as shown in FIG. 5, the identical fitting may be used as is used on a plastic service main 14, and the same reference numbers have been used to designate identical parts with identical functions. Instead of using the cutter plug 60, which is intended only for a plastic main 14, a drill assembly is used as shown in FIG. 8. This drill assembly consists of drill bit guide tube 100, 102 or 104, each having a different size drill bit guide opening 106, 108 or 110 extending axially therethrough, and each may be provided with a partly countersunk sealing O-ring 111 to minimize leakage along the long cyclindrical shank 112 of a short fluted drill bit 114, the end of the shank 112 being secured, in a conventional manner, to a conventional manner, to a conventional drill 115, which may be either a hand drill or an electric power drill, depending on the availability of a source of electricity. Each of the guide tubes 100, 102 and 104 is externally threaded at 116 complementary to the internal thread 22 of small counterbore 20 and at its upper end, has a knurled flange 118 providing a bottom shoulder abutting against the end annulus of tube 18. Another sealing O-ring 120 may be partly countersunk in this flange bottom shoulder to further minimize leakage while drilling the tap hole in the metal service main 16.

To facilitate the entrance of the drill bit 114 through the guide tube 100, the entrance end of the guide tube opening may be beveled at 122. In operation of this tap hole drill, the fitting 10 is first assembled on the metal service main 16 and the service tube 30 is conventionally connected to the service pipe. Then the appropriate guide tube is threaded into the internal thread 22 until the bottom shoulder of knurled flange 118 abutts the top annulus on the tube 18. Then, the short fluted drill bit 114 is inserted through the guide tube opening, the cylindrial shank 112 reaching and extending through the O-ring III and through the greater part of the tube opening, which it fits snugly but not too tightly, and the short flutes on the drill bit are mainly below the bottom end of the guide tube 100. As the drill bit enters, it pushes aside the valve flap 52 to drill the tap hole, and when it is completed, it is withdrawn, the drilled particles flushing out with the fluid from the tap hole to the service tube 30. The valve flap 52 closes as the drill bit is withdrawn, and then the sealing cap 82 is put in place. If and when desired, the same type and size of aluminum sealing plug 90 may be used, and in this case, it will be the material of the plug, which is softer than that of the service main 16, which will coldflow to sealing position.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A valve tap fitting readily attachable to a service main comprising a service fitting having a tube, said tube having a through bore and a lateral outlet, said fitting having an arcuate saddle through which said through bore extends, said arcuate saddle being complementary to a service main to which it is to be secured, means for securing and sealing said arcuate saddle to the service main with said through bore extending against the service main within said sealing means, said through bore being a counterbore with a large counterbore extending to the service main end thereof, and a counterbore shoulder flange and flange opening connecting the large counterbore to a small, cylindrical counterbore extending through the outer end of said through bore, said small counterbore having an internal thread extending inwardly from its outer end toward said shoulder flange, the diameter of the opening in said shoulder flange being less than the diameter of said threaded small counterbore, a valve ring secured in said large counterbore against said shoulder flange, and a valve flap, of a diameter greater than that of said shoulder flange opening and of a lesser diameter than that of said valve ring, hinged at a small portion of its edge to said valve ring, to seat toward and on said shoulder flange and to open toward the service main end of said large counterbore.

2. The fitting of claim 1, said valve ring and valve flap being of an integral piece of somewhat flexible plastic material.

3. The fitting of claim 1, the outer periphery of said valve flap being beveled inwardly to provide a feather edge toward the large counterbore service end to permit maximum hinging of said valve flap away from said shoulder flange.

4. The fitting of claim 1, the internal diameter of said large counterbore being progressively larger from its shoulder flange end toward its service main end, providing room for said valve flap to hinge to a position outside of a projection of said shoulder flange opening.

5. The fitting of claim 1, said saddle securing and sealing means including a washer and a washer receiving recess in the service main contacting surface of said saddle concentric with said bore therethrough, said recess in its entirety being spaced from and undercut toward said bore to prevent coldflow of said washer therein toward said bore.

6. The fitting of claim 1, said through bore tube also having an exterior thread extending from its outer end, a complemenntary threaded cap screwed thereover, said cap having an O-ring receiving groove in its tube end annulus engaging surface, and an O-ring in said cap groove providing an effective seal between said cap and said tube and annulus.

7. The fitting of claim 1, in combination with a service main coupon cutting and trapping plug, said plug being threaded complementary to said internal thread of said smaller counterbore, a neck on one end of said threaded portion of said plug of a reduced diameter, said neck having a coaxial circular cutting blade to extend through said shoulder flange and past said valve flap, and, when said threaded plug portion is approaching said shoulder flange, to extend through and beyond the surface of said larger counterbore service main into coupon cutting and trapping position in the service main, and tool cooperating means on the other end of said threaded portion of said plug for threading said plug into said small threaded counterbore.

8. The fitting of claim 7, said coupon cutting and trapping plug having an axial opening extending therethrough for receiving a plunger rod therethrough for removing the trapped coupon therein.

9. The fitting of claim 7, the length of said threaded portion of said plug being substantially equal to the length of said threaded small counterbore, whereby when said threaded plug portion has been entirely threaded into said threaded small counterbore, said circular cutting blade will have cut through the service main and have entrapped the cut coupon therewithin.

10. The fitting of claim 7, said saddle securing means including a saddle clamp, said saddle and said saddle clamp having complementary extending apertured ears and fastening means extending through said ears for holding said saddle and saddle clamp in service main embracing position, and tool cooperating means on said fastening means having a same size as said tool cooperating means on said coupon cutting plug.

11. The fitting of claim 1, in combination with drill bit guide plug, said guide plug being threaded complementary to said internal thread of said smaller counterbore, and an axial drill bit guide opening extending therethrough.

12. The fitting of claim 11, and a drill bit complementary to said drill bit guide opening, said drill bit having a long cylindrical shank and a short drill bit flute portion whereby at least a portion of said long cylindrical shank will be within said guide opening in said guide tube to prevent substantial leakage therethrough.

13. The fitting of claim 1, and means extendable through said counterbore and past said valve flap for making a tap hole in a service main to which said fitting is secured, in combination with a service main tap hole readily removable sealing plug, said sealing plug having a threaded portion complementary to said internal thread in said small counterbore, and a reduced diameter cylindrical neck terminating in a smoothly extending semispherical portion extending from said threaded portion of said sealing plug and extendable past said valve flap into sealing cooperation with the service main tap hole.

14. The fitting of claim 13, said neck hemispherical end having an area complementary to the service main tap hole, the material of said sealing plug being of a different degree of hardness than the material of the service main, whereby there will be a coldflow of the material of one of them as said sealing plug is threaded against the edge of said service main tap hole.

15. The fitting of claim 1, said tube and said arcuate saddle being integral and of suitable tough plastic material.

16. The fitting of claim 15, said material being polyethylene type 3, long lineal plastic.

17. The fitting of claim 1, said saddle securing means including a saddle clamp, said saddle clamp also being complementary to the service main to which it is to be secured, said saddle and said saddle clamp having complementary extending apertured ears and fastening means extending through said ears for holding said saddle and said saddle clamp in service main complementing and embracing position.

18. The fitting of claim 17, said tube, saddle and saddle clamp being of polyethylene type 3, long lineal plastic material.

References Cited by the Examiner
UNITED STATES PATENTS

| | | | |
|---|---|---|---|
| 2,287,354 | 6/1942 | Misch | 77—37 |
| 2,299,814 | 10/1942 | Gale et al. | 77—41 |
| 2,770,260 | 11/1956 | Henderson | 220—39 X |
| 2,790,652 | 4/1957 | Risley et al. | 137—318 X |
| 2,839,075 | 6/1958 | Mueller | 137—318 |
| 2,936,657 | 5/1960 | Berlin et al. | 77—62 |
| 2,964,290 | 12/1960 | Mueller | 137—318 X |
| 2,972,915 | 2/1961 | Milanovits et al. | 77—42 |

ISADOR WEIL, *Primary Examiner.*

WILLIAM F. O'DEA, *Examiner.*